US007143435B1

(12) United States Patent
Droms et al.

(10) Patent No.: US 7,143,435 B1
(45) Date of Patent: Nov. 28, 2006

(54) METHOD AND APPARATUS FOR REGISTERING AUTO-CONFIGURED NETWORK ADDRESSES BASED ON CONNECTION AUTHENTICATION

(75) Inventors: Ralph Droms, Westford, MA (US); John M. Schnizlein, Fort Washington, MD (US)

(73) Assignee: Cisco Technology, Inc., San Jose, CA (US)

( * ) Notice: Subject to any disclaimer, the term of this patent is extended or adjusted under 35 U.S.C. 154(b) by 846 days.

(21) Appl. No.: 10/210,513

(22) Filed: Jul. 31, 2002

(51) Int. Cl.
*G06F 15/16* (2006.01)
(52) U.S. Cl. .......................... 726/3; 713/153
(58) Field of Classification Search .................. 726/3
See application file for complete search history.

(56) References Cited

U.S. PATENT DOCUMENTS

| 5,581,552 | A | * | 12/1996 | Civanlar et al. ............ 370/396 |
| 5,757,924 | A | * | 5/1998 | Friedman et al. ........... 713/151 |
| 5,812,819 | A | * | 9/1998 | Rodwin et al. ............... 703/23 |
| 5,941,956 | A | * | 8/1999 | Shirakihara et al. ........ 709/245 |
| 5,951,650 | A | * | 9/1999 | Bell et al. ................... 709/238 |
| 6,012,088 | A | * | 1/2000 | Li et al. ..................... 709/219 |
| 6,023,464 | A | * | 2/2000 | Woundy ..................... 370/352 |
| 6,023,563 | A | * | 2/2000 | Shani ......................... 709/249 |
| 6,029,196 | A | * | 2/2000 | Lenz .......................... 709/221 |
| 6,041,358 | A | * | 3/2000 | Huang et al. ............... 709/238 |
| 6,067,568 | A | * | 5/2000 | Li et al. ..................... 709/223 |
| 6,091,737 | A | * | 7/2000 | Hong et al. ................. 370/431 |
| 6,101,499 | A | * | 8/2000 | Ford et al. .................... 707/10 |
| 6,115,545 | A | * | 9/2000 | Mellquist .................... 709/220 |
| 6,128,664 | A | * | 10/2000 | Yanagidate et al. ......... 709/228 |
| 6,131,121 | A | * | 10/2000 | Mattaway et al. .......... 709/227 |
| 6,154,776 | A | * | 11/2000 | Martin ........................ 709/226 |
| 6,172,981 | B1 | * | 1/2001 | Cox et al. ................... 370/401 |
| 6,233,616 | B1 | * | 5/2001 | Reid ........................... 709/225 |
| 6,240,513 | B1 | * | 5/2001 | Friedman et al. ........... 713/152 |
| 6,289,377 | B1 | * | 9/2001 | Lalwaney et al. .......... 709/222 |
| 6,311,218 | B1 |   | 10/2001 | Jain et al. |
| 6,324,577 | B1 | * | 11/2001 | Hirai .......................... 709/223 |
| 6,331,984 | B1 | * | 12/2001 | Luciani ...................... 370/401 |
| 6,351,773 | B1 | * | 2/2002 | Fijolek et al. .............. 709/228 |
| 6,359,894 | B1 | * | 3/2002 | Hong et al. ................. 370/402 |
| 6,374,295 | B1 | * | 4/2002 | Farrow et al. .............. 709/223 |
| 6,393,484 | B1 | * | 5/2002 | Massarani ................... 709/227 |
| 6,412,025 | B1 | * | 6/2002 | Cheston et al. ................ 710/8 |
| 6,415,313 | B1 | * | 7/2002 | Yamada et al. ............. 709/200 |

(Continued)

OTHER PUBLICATIONS

Peter Loshin, IPV6 clearly explained, 1999, Morgan Kaufmann.*

(Continued)

*Primary Examiner*—Ayaz Sheikh
*Assistant Examiner*—David Garcia Cervetti
(74) *Attorney, Agent, or Firm*—Hickman Palermo Truong & Becker, LLP

(57) ABSTRACT

A method and apparatus for registering auto-configured network addresses includes receiving first data at a networking device connected to a host at a physical connection. The first data is received from a first server and indicates authentication information associated with the host. A first message is received at the networking device from the host. The first message requests configuration information and includes a logical network address for the host determined at least in part by the host. A second message is generated based on the first message and the first data. The second message is sent to a second server that registers the host by associating the logical network address with the first data.

29 Claims, 7 Drawing Sheets

U.S. PATENT DOCUMENTS

| | | | | |
|---|---|---|---|---|
| 6,539,431 | B1* | 3/2003 | Sitaraman et al. | 709/226 |
| 6,553,568 | B1* | 4/2003 | Fijolek et al. | 725/111 |
| 6,560,642 | B1* | 5/2003 | Nurmann | 709/220 |
| 6,614,774 | B1* | 9/2003 | Wang | 370/338 |
| 6,614,788 | B1* | 9/2003 | Martin et al. | 370/392 |
| 6,636,502 | B1* | 10/2003 | Lager et al. | 370/352 |
| 6,667,971 | B1* | 12/2003 | Modarressi et al. | 370/352 |
| 6,684,243 | B1* | 1/2004 | Euget et al. | 709/222 |
| 6,687,252 | B1* | 2/2004 | Bertrand et al. | 370/401 |
| 6,748,434 | B1* | 6/2004 | Kavanagh | 709/224 |
| 6,753,887 | B1* | 6/2004 | Carolan et al. | 715/764 |
| 6,771,962 | B1* | 8/2004 | Saifullah et al. | 455/436 |
| 6,856,602 | B1* | 2/2005 | Westberg | 370/254 |
| 6,912,567 | B1* | 6/2005 | Allard et al. | 709/223 |
| 6,915,345 | B1* | 7/2005 | Tummala et al. | 709/225 |
| 6,948,003 | B1* | 9/2005 | Newman et al. | 709/250 |
| 6,954,790 | B1* | 10/2005 | Forslow | 709/227 |
| 6,959,009 | B1* | 10/2005 | Asokan et al. | 370/475 |
| 7,002,924 | B1* | 2/2006 | Braun et al. | 370/254 |
| 2001/0017856 | A1* | 8/2001 | Asokan et al. | 370/389 |
| 2001/0048686 | A1* | 12/2001 | Takeda et al. | 370/401 |
| 2002/0003780 | A1* | 1/2002 | Braun et al. | 370/254 |
| 2002/0006133 | A1* | 1/2002 | Kakemizu et al. | 370/401 |
| 2002/0007411 | A1* | 1/2002 | Shaked et al. | 709/229 |
| 2002/0013844 | A1* | 1/2002 | Garrett et al. | 709/225 |
| 2002/0059614 | A1* | 5/2002 | Lipsanen et al. | 725/75 |
| 2002/0069278 | A1* | 6/2002 | Forslow | 709/225 |
| 2002/0136226 | A1* | 9/2002 | Christoffel et al. | 370/401 |
| 2002/0142771 | A1* | 10/2002 | Saifullah et al. | 455/436 |
| 2002/0161905 | A1* | 10/2002 | Haverinen et al. | 709/229 |
| 2002/0191572 | A1* | 12/2002 | Weinstein et al. | 370/338 |
| 2003/0028763 | A1* | 2/2003 | Malinen et al. | 713/155 |
| 2003/0035409 | A1* | 2/2003 | Wang et al. | 370/349 |
| 2003/0039210 | A1* | 2/2003 | Jin et al. | 370/229 |
| 2003/0051041 | A1* | 3/2003 | Kalavade et al. | 709/229 |
| 2003/0092425 | A1* | 5/2003 | Okazaki et al. | 455/411 |
| 2003/0182548 | A1* | 9/2003 | Xiong et al. | 713/153 |
| 2003/0212774 | A1* | 11/2003 | Lee et al. | 709/222 |
| 2004/0037316 | A1* | 2/2004 | Choi et al. | 370/466 |
| 2004/0199666 | A1* | 10/2004 | King et al. | 709/238 |
| 2004/0240411 | A1* | 12/2004 | Suzuki | 370/331 |

OTHER PUBLICATIONS

Misra et al., Autoconfiguration, registration, and mobility management for pervasive computing, Aug. 2001, IEEE.*

Hagino et al., Requirements for IPv6 dialup operation, Nov. 2001, IETF.*

Bound et al., Dynamic Host Configuration Protocol for IPv6 (DHCPv6), Jun. 2001, IETF.*

Patrick, M., DHCP Relay Agent Information Option, Jan. 2001, IETF.*

Braun et al., An AAA architecture extension for providing differentiated services to mobile IP users, Jul. 2001, IEEE.*

3GPP, IPv6 Update, Jun. 2002, <http://www.3gpp.org/ftp/TSG_T/TSG_T/TSGT_16/Docs/PDFs/TP-020097.pdf>.*

Aboba et al., RADIUS and IPv6, RFC 3162, Aug. 2001, IETF.*

Thomson et al., IPv6 Stateless Address Autoconfiguration, RFC 2462, Dec. 1998, IETF.*

R. Droms, "Dynamic Host Configuration Protocol", Mar. 1997, pp. 1-45.

S. Alexander et al., "DHCP Options and BOOTP Vendor Extensions", Mar. 1997, pp. 1-34.

* cited by examiner

METHOD AND APPARATUS FOR REGISTERING AUTO-CONFIGURED NETWORK ADDRESSES BASED ON CONNECTION AUTHENTICATION

CROSS-REFERENCE TO RELATED APPLICATIONS

This application is related to application Ser. No. 09/981,182, filed Oct. 16, 2001, hereinafter referenced as Schnizlein et al., the entire contents of which are hereby incorporated by reference as if fully set forth herein.

FIELD OF THE INVENTION

The present invention generally relates to dynamically assigning network addresses. The invention relates more specifically to registering auto-configured network addresses based on connection authentication.

BACKGROUND OF THE INVENTION

The approaches described in this section could be pursued, but are not necessarily approaches that have been previously conceived or pursued. Therefore, unless otherwise indicated herein, the approaches described in this section are not admitted to be prior art by inclusion in this section.

A computer network typically includes computer processors or "hosts" that host software applications that provide or request services, or both. The hosts may be network terminals or end stations that do not perform network traffic routing or forwarding functions but merely produce or consume data. The hosts communicate with each other through network devices, also called intermediate devices, such as switches and routers, which do perform routing and forwarding functions. Some intermediate devices are themselves hosts for some routing or forwarding applications and services. Internet Protocol (IP) is often used for sending packets of information between processes running on hosts on a network. As used hereinafter, a server refers to a server process that provides a service and a client refers to a client process that requests a service, unless otherwise indicated to refer to the host or device on which the process executes. According to the Internet Protocol (IP), different hosts have different logical addresses, called IP addresses, which are used by the intermediate devices to route and forward data packets from one host to another.

A local area network (LAN) connects hosts in a relatively small geographic area for sharing resources. Resources shared on the LAN often include data files, devices such as printers, and applications such as word processors. LAN protocols function at the level of the physical connection between devices on the LAN, and the data link between the connection and the operating system on a device. In contrast, IP functions at a higher level where client and server processes send or receive data directed to each other. Intermediate devices that forward packets on the basis of their built-in, media access control (MAC) addresses are called switches. Intermediate devices that forward packets on the basis of administratively controlled, topologically relevant, logical addresses, such as IP addresses, are called routers.

Many LAN protocols give access to all resources on the LAN to every host physically connected to the LAN. In many circumstances, LAN administrators desire to control access to resources on the LAN by limiting physical connection to the LAN to certain authorized hosts.

An emerging LAN protocol for controlling access to LAN resources is defined by the Institute of Electrical and Electronics Engineers (IEEE) standard 802.1x. IEEE 802.1x provides LAN access control based on physical ports. In this context, a physical port is a single point physical connection, such as a single interface card, to an intermediate device on the LAN. A physical port may include a wireless interface that receives electromagnetic signals. Many intermediate devices, such as switches and routers, each have multiple interface cards. A physical port is an element of one of the interface cards on such an intermediate device. IEEE 802.1x provides a mechanism for authenticating and authorizing hosts attached to a LAN physical port, and of preventing access through that physical port in cases where the authentication and authorization process fail. The standard provides user-to-network authentication.

According to IEEE 802.1x, information is sent from a supplicant process, hereinafter called the supplicant, on the newly connected host to the intermediate device at the physical port. The information sent by the supplicant might be stored persistently on the host being connected; or the information might be received from a human user of the host, such as in response to prompts for user name and password; or some combination of stored and user-supplied information may be used. The intermediate device runs an authenticator process, hereinafter called the authenticator. The authenticator sends a request to an authorization, authentication and accounting ("AAA") system based on the information from the supplicant. An example of an AAA system is a RADIUS (Remote Access Dial-In User Service protocol) server. The AAA system returns a response indicating whether the connection should succeed or fail. If the response indicates the connection fails, the intermediate device does not forward data communicated to the physical port from the host. If the response indicates the connection succeeds, the intermediate device does forward data communicated to the physical port from the host.

In addition to obtaining access to the network through the physical port, the host also must be configured for network operations. For example, a newly added host is assigned a logical network address for itself, a network address for the intermediate device that routes or forwards its traffic, and a network address of a domain name server (DNS), among other configuration information. The DNS converts unique names in a Universal Resource Locator (URL) address to one or more numeric, topologically relevant, IP addresses. Configuring a host is a tedious process to perform manually. The Dynamic Host Configuration Protocol (DHCP) provides a mechanism through which computers using IP can obtain network addresses and other configuration information automatically. The DHCP process is initiated after the physical connection is authorized using IEEE 802.1x.

According to a next generation Internet protocol packet format, also known as IP version 6 ("IPv6"), the number of different IP addresses, and the number of bits involved in specifying an IP address, are greatly expanded. IPv6 further allows each host to determine its own address to some degree. An intermediate device to which the host is connected advertises a range of contiguous addresses, called a subnet, from which the host may select an address. The host determines the last 64 bits of the address within the advertised subnet. Because the host determines its own address, it is said to "auto-configure" its address; and the address can be called an "auto-configured address." According to IPv6, the host does not need to request an IP address or any other configuration information from a DHCP server before determining its address. The auto-configuration that proceeds without information about the state of the network from a DHCP server is sometimes said to be "stateless auto-configuration."

In some circumstances, the host can be required to obtain configuration information, either including or excluding its IP address, from a DHCP server. Data included in the advertisements sent from the intermediate device indicates whether the host is required to obtain configuration information from a DHCP server.

After obtaining access through the physical port and receiving a configuration, a client on the user's host may request services from servers on the network using IP. In many circumstances, user authentication is also useful in IP communications. For example, based on the user of a client process, it is sometimes desirable to determine accounting information for billing purposes, to provide a minimum quality of service (QoS) according to a contract with the user, or to limit access by the user to certain servers, or to perform some combination of these functions. Many systems track such functions based on the IP address of the client. Intermediate devices serving as conventional gateways to the Internet, for example, control access to the Internet based on access control lists. Each access control list includes one or more entries consisting of source and destination IP addresses, a protocol or service identifier, and an action to perform on matching traffic, such as "permit" or "deny". To utilize such systems, techniques for assigning IP addresses based on the user-to-network authentication process was developed, as described in Schnizlein et al.

A problem with this process arises when the IP address is a stateless auto-configured address allowed by IPv6. The stateless auto-configured address does not depend on information received from a server, such as a DHCP server. Therefore, the configuration server cannot produce an IP address assignment that is consistent with access policies defined by predetermined IP addresses.

For example, assume a hypothetical enterprise "ABC Corporation" has several employees with devices that connect to the corporate LAN. Some employees are allowed to connect to the Internet, and others are confined to the LAN. Under processes described in Schnizlein et al., the authentication information used to activate the connection under IEEE 802.1x is used to assign an IP address associated with the Internet access allowed to each employee. One set of IP addresses on the corporate network is used to assign addresses to employees allowed access to the Internet; another set of IP addresses on the corporate network is used to assign addresses to employees who are not allowed access to the Internet. When an employee confined to the LAN connects a device to an intermediate device under IPv6, however, the employee or device can select any IP address within a subnet. The selected IP address may not be within any set of IP addresses that are associated with the correct type of Internet access.

Based on the foregoing, there is a clear need for techniques that provide network controls per user when a host is allowed to define its own network address.

One approach is to require the user to provide information for the authentication and authorization system whenever requesting a network service. This approach would also modify all the network servers to send a request to the authorization and authentication system, such as the RADIUS server, based on the information from the user. Based on the response from the authorization and authentication system, the server would provide services associated with the privileges to be afforded to the user, such as accounting, QoS (Quality of Service) access to LAN resources, and access to the Internet.

However, this approach has numerous disadvantages. One disadvantage is that the user is subjected to entering the same identification and password information multiple times in response to prompts—once for the IEEE 802.1x process and again for each service with user based privileges, also called "per-user controls." This multiplies the burden on the user, increases many times the chances of an entry mistake that causes the service to fail, decreases the quality of the user experience, and hinders the perceived utility of the network.

Another disadvantage is that a client process on the user's host, such as a DHCP client process, would have to be modified to prompt for the needed information. However, this approach is not practical because tens of millions of clients have already been deployed over the last decade without such a modification. It would be expensive and take many years to even replace a significant fraction of the deployed clients.

Based on the foregoing, there is a clear need for techniques that register auto-configured IP addresses, by associating them with user information, based on results from an authentication process. In particular, there is a need for a DHCP server that registers an auto-configured IP address based on results from processes following the IEEE 802.1x standard.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
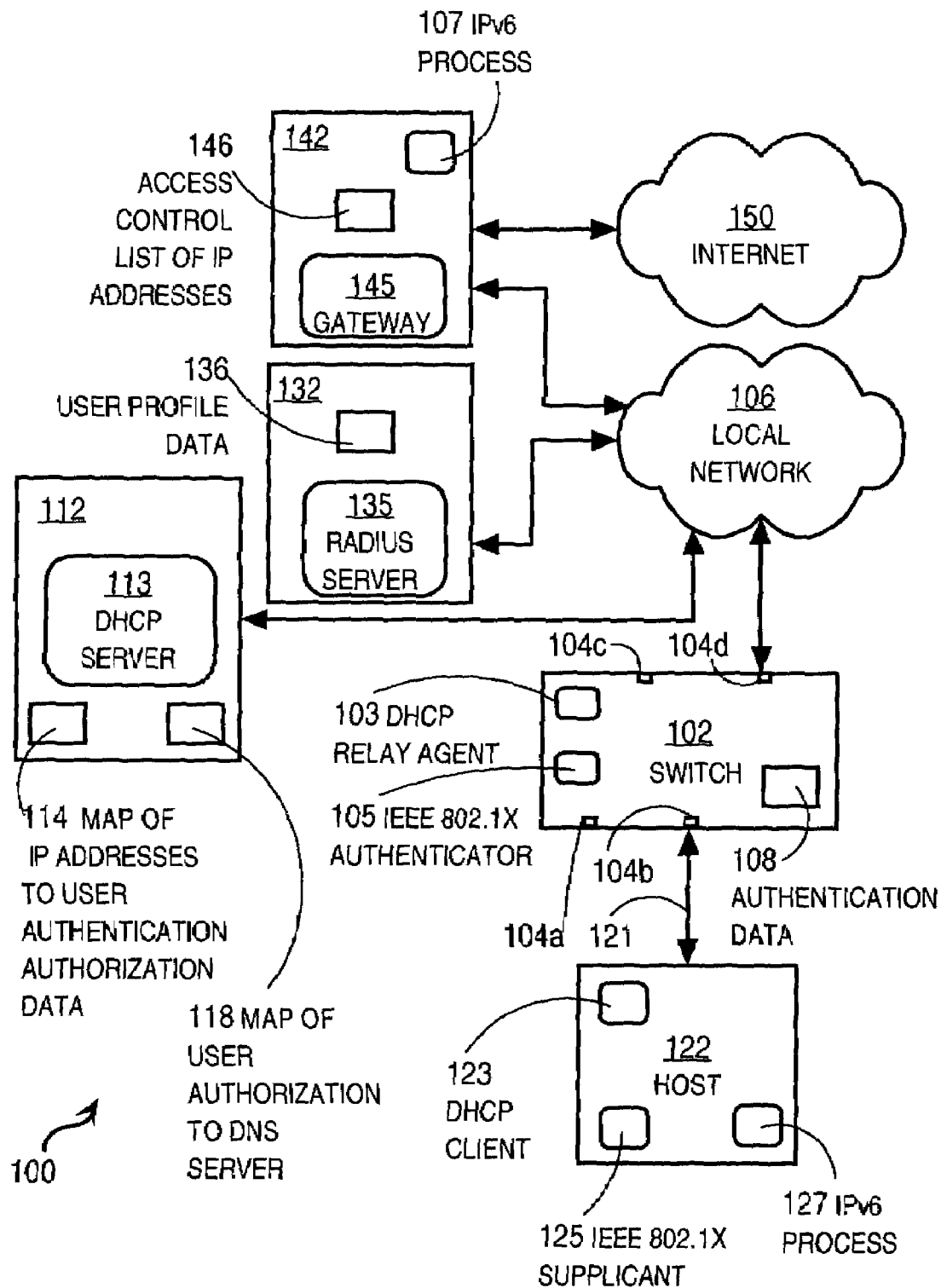
FIG. 1 is a block diagram that illustrates an overview of a system for authorizing a physical connection and configuring a host for network operations.

A method and apparatus for registering auto-configured network addresses is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
 2.1 Structural Overview
 2.2 Functional Overview
3.0 Method of Registering Auto-configured Addresses
 3.1 Authenticator
 3.2 Relay Agent
 3.3 DHCP Server
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for registering auto-configured network addresses. The method includes receiving first data at a networking device connected to a host at a physical connection. The first data is received from a first server and indicates authentication information associated with the host. A first message is received at the networking device from the host. The first message requests configuration information and includes a logical network address for the host determined at least in part by the host. A second message is generated based on the first message and the first data. The second message is sent to a second server that registers the host by associating the logical network address with the first data.

In another aspect of the invention, a method of registering auto-configured network addresses includes receiving a first request from a host connected to a networking device by a physical connection. The first request includes information about a user of the host. A second request for authentication of the physical connection is sent to a first server that provides authentication or authorization information or both. The second request is based on the first request. First data is received at the intermediate device from the first server in response to the second request. The first data indicates authentication or authorization information or both. Based on the first data, the physical connection is enabled to forward subsequent messages between the host and a network connected to the intermediate device. The first data is stored at least until a third request is received from the host for configuration information for the host. The third request includes a logical network address for the host determined at least in part by the host. The first data is stored for use in registering the logical network address by associating the first data with the logical network address.

In another aspect of the invention, a method of registering auto-configured network addresses includes receiving a first request from a host at a networking device connected to the host at a physical connection. The first request is for configuration information for the host and includes a logical network address for the host determined at least in part by the host. First data is retrieved from the networking device. The first data indicates authentication or authorization information, or both, received from a first server in response to a request for authentication of the physical connection. A second request is generated based on the first request and the first data. The second request is sent to a second server that registers the host by associating the logical network address with the first data.

In another aspect of the invention, a method of registering auto-configured network addresses includes receiving a request from a networking device connected to a host at a physical connection. The request is for configuration information for the host. The request includes a logical network address and first data. The logical network address is for the host and is determined at least in part by the host. The first data indicates authentication or authorization information, or both, received from a first server in response to a request for authentication for the physical connection. The logical network address is registered by associating the logical network address with the first data.

In another aspect of the invention, a method of registering auto-configured network addresses includes receiving a request from a networking device connected to a host at a physical connection. The request is for configuration information for the host and includes a logical network address for the host determined at least in part by the host. First data is received from a first server in response to a request for authentication for the physical connection. The first data indicates at least one of authentication and authorization information. The logical network address is registered by associating the logical network address with the first data.

In other aspects, the invention encompasses a computer apparatus, and a computer readable medium, including a carrier wave, configured to carry out the foregoing steps.

Embodiments of the invention may be used with a protocol for controlling access to LAN resources based on a physical port, and with a configuration server, and with an authentication and authorization server. For purposes of illustrating a specific example of the authentication of a physical connection and the configuration of a host, embodiments are described herein in the context of the IEEE 802.1x standard, the RADIUS authentication, authorization and accounting (AAA) servers, and the Dynamic Host Configuration Protocol (DHCP) for the current Internet protocol, IPv4, or for IPv6. "DHCP" is used to refer to either DHCP for IPv4 or DHCP for IPv6, unless otherwise specified. However, this specific context is not required, and other standards, protocols and servers may be substituted.

IEEE 802.1x applies to Ethernet ports including wireless Ethernet ports. A wireless Ethernet port is herein considered a physical port. Hardware separates the wireless Ethernet ports based on a particular time slot and encryption key combination.

The Dynamic Host Configuration Protocol (DHCP) is an open standard protocol for dynamic host configuration described in RFC 2131 and RFC 2132, which are available at the time of this writing as documents rfc2131.html and rfc2132.html, respectively, on the World Wide Web (www) at domain and directory ietf.org/rfc. DHCP for IPv6, designated hereinafter as "DHCPv6," is extended to operate with the extended addresses and features of IPv6. A DHCP server process operates on a DHCP server host that is conveniently located for several hosts on one or more local networks. One or more DHCP server hosts and processes are set up by a system administrator with information to configure the hosts on one or more local networks to reflect the current architecture and policies of those local networks. A DHCP client process operates on each host of the local networks.

A DHCP relay agent is a process that executes on an intermediate device to forward DHCP messages between DHCP client and DHCP server. The DHCP relay agent facilitates communications with the DHCP client before the DHCP client's host is bound to a particular IP address. The DHCP relay agent is used when the DHCP client cannot broadcast directly to the DHCP server because it is separated from that DHCP server by network intermediate devices such as switches and routers. In this case, the DHCP relay agent on the intermediate device closest to the DHCP client receives a broadcast to a well known logical port, port 67, and then forwards the DHCP client's packet on to all DHCP servers for which the relay agent is configured. In this way, the DHCP client can broadcast locally and still make contact with one or more DHCP servers separated by one or more intermediate devices.

2.0 Structural and Functional Overview 2.1 Structural Overview

FIG. 1 is a block diagram that illustrates an overview of a system for authorizing a physical connection and registering auto-configured logical network addresses.

In the example of FIG. 1, system 100 includes a switch 102 that is communicatively coupled to a local network 106. A host 122 connects to the local network 106 through switch 102. The system 100 also includes a RADIUS server host 132 which functions as an authentication, authorization and accounting (AAA) server, a DHCP server host 112 and a gateway host 142. The gateway host 142 is connected to Internet 150, or to any other public network or internetwork.

The switch 102 includes physical ports 104*a*, 104*b*, 104*c*, 104*d*, collectively referenced as physical ports 104. The switch 102 employs the IEEE 802.1x standard for physical-port-based access control. An authenticator 105 executes on a processor of the switch 102 to apply the IEEE 802.1x standard. Authenticator 105 stores authentication and authorization data in a persistent store 108 on the switch 102, as described in more detail below. The authentication and authorization data contains information obtained from the RADIUS server host 132. IEEE 802.1x does not require or suggest storage of the authentication and authorization data from a RADIUS server host 132 at the switch 102, as described in more detail below.

In addition, in the example of FIG. 1, a DHCP relay agent 103 also executes on the processor of switch 102. DHCP relay agent 103 communicates using DHCP messages with a DHCP client on host 122 and a DHCP server on the DHCP server host 112. DHCP relay agent 103 uses the authentication and authorization data in the persistent store 108 on the switch, as described in more detail below. DHCP does not require or suggest using the authentication and authorization data from a RADIUS server host by a DHCP relay agent 103.

In addition, in the example of FIG. 1, an IPv6 process 107 also executes on the processor of gateway 142. IPv6 process 107 periodically broadcasts advertisements over interfaces 104 that indicate a subnet of IPv6 addresses that are handled by switch 102. IPv6 process 107 includes in the advertisements data that indicates whether hosts connected to switch 102 should request configuration information, either including or excluding an IPv6 address, from a configuration server.

The host 122 employs the IEEE 802.1x standard for physical-port-based access control and DHCP for network configuration information, but determines its own IPv6 address within the subnet advertised by the switch 102. That is, host 122 generates an auto-configured network address independent of the DHCP server. The host is connected to physical port 104*b* of switch 102 through connection 121. The connection 121 may be by cable or by a wireless signal, such as an electromagnetic or acoustic signal.

A supplicant 125 executes on a processor of the host 122 to apply the IEEE 802.1x standard. The supplicant obtains information from a user of the host, such as the user identification and password, and sends that information to the authenticator 105 through physical port 104*b* using connection 121. A IPv6 process 127 executes on a processor of host 122 to generate the IPv6 address for the host 122. A DHCPv6 client 123 executes on the processor of the host 122 to obtain configuration information, excluding the IPv6 address, from a DHCPv6 server.

The RADIUS server host 132 includes a processor that executes a RADIUS server 135. The RADIUS server provides authentication, authorization and accounting (AAA) services. Authentication services determine that a user is who the user claims to be, such as by verifying a password and user identification combination. Authorization services indicate that the authenticated user has certain privileges to perform operations on the network. For example, an authorization service determines that an authenticated user is allowed to establish a physical connection to the local network but is not allowed to access the Internet. Accounting services determine that the user's use of authorized operations is tracked, for example to support QoS agreements and to enforce usage limits. The RADIUS server maintains one or more data structures of user profile data 136 that includes the user identification, password, and privileges. The RADIUS server 135 receives a request from the authenticator 105 to authenticate the user of host 122. The RADIUS server sends a response indicating whether authentication succeeds or fails. In some embodiments, when the authentication succeeds, the RADIUS server also sends authorization information.

According to one embodiment, a user class is associated with each user in the user profile data 136. Multiple users of the local network who have substantially the same authorizations for LAN resources and accounts, as enforced by one or more services on the LAN, are placed in the same user class. In this embodiment, the user class is included in authorization information sent by the RADIUS server to the authenticator 105.

The DHCP server host 112 includes a processor on which executes a process called the DHCPv6 server 113. The DHCPv6 server 113 applies DHCPv6 for exchanging messages with DHCP clients and DHCP relay agents in order to provide configuration information to hosts that become connected to the local network 106.

The DHCPv6 server 113 assigns IP addresses from several pools of IP addresses in response to a DHCP discovery (DISCOVER) message, as described in Schnizlein et al. However, a host employing an auto-configured IPv6 address does not send a DISCOVER message.

According to the illustrated embodiment, the DHCPv6 server 113 registers auto-configured IPv6 addresses in response to DHCP information request (INFORM) messages. The DHCPv6 server 113 performs the registration by storing a data structure herein called a map 114. Map 114 associates an IPv6 address supplied in the INFORM message by the host with authentication or authorization information, or both, supplied in the INFORM message by a DHCPv6 relay agent in an intermediate device connected to the host. Conventional DHCP does not require or suggest that the DHCPv6 server 113 obtain authentication or authorization information from a DHCP relay agent. Conventional DHCP does not require or suggest that the DHCPv6 server 113 store or use the map 114.

In addition, in some embodiments, the DHCPv6 server 113 also stores one or more data structures that associate other configuration information with authentication or authorization information, or both. In the illustrated embodiment, the DHCP server 113 stores a data structure herein called a map 118 that associates a domain name server (DNS) with some authentication or authorization information. In the illustrated embodiment, the DNS is associated with a user group. One DNS is associated with a user group that does not have Internet access; such a DNS will not resolve references to domain names outside the local network 106. Conventional DHCP does not require or suggest that the DHCP server 113 store or use map 118.

The gateway host 142 includes a processor on which executes a process called a gateway 145. The gateway 145 determines whether a client process on a host connected to the local network may exchange data packets over the Internet 150, based on the IP address of the host where the client is executing. The gateway maintains an access control list 146 of IP addresses in one or more data structures. Only a client operating on a host having an IP address included in the access control list 146 is allowed by the gateway 145 to exchange data packets over the Internet 150. If a request to access the Internet comes from a host with an address unknown to the gateway 145, the gateway 145 may request user identification information associated with that address from the DHCP server host 112 based on information in the map 114. The gateway 145 also may obtain authorization information such as an access control list from the AAA server 132. The gateway 145 is one example of a network server in which the service provided depends on registering an auto-configured logical network address.

Although shown in FIG. 1 as executing on separate hosts, in other embodiments, any process of a certain group, which includes the DHCP server, the RADIUS server and the gateway, may execute on the same host as one or more other processes of that certain group.

2.2 Functional Overview

Figure 2:
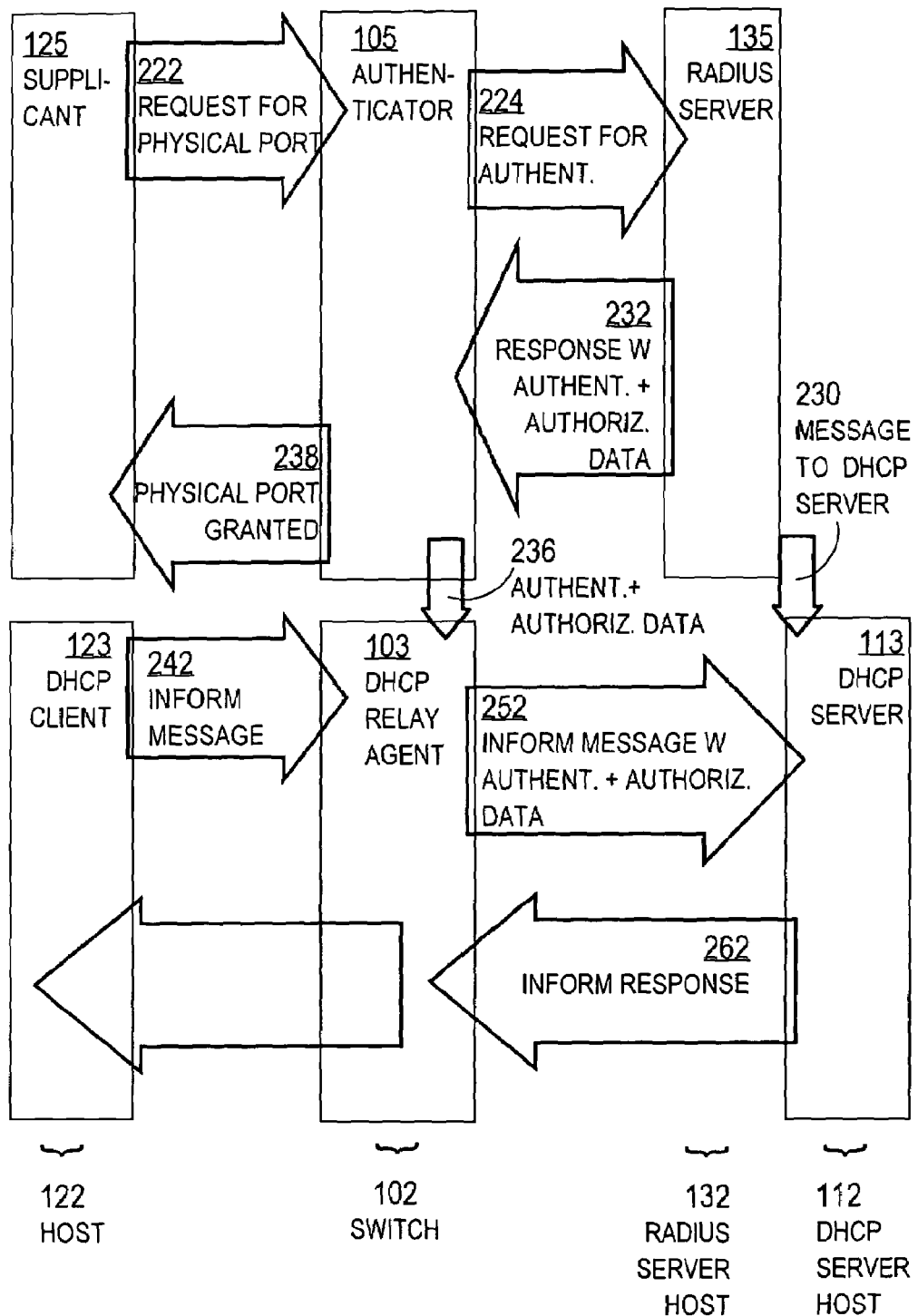
FIG. 2 is a time line chart that illustrates an sequence of messages sent between some components of the system of FIG. 1.

FIG. 2 is a time line chart that illustrates a sequence of messages sent between some components of the system of FIG. 1. In FIG. 2, time increases from top to bottom. Blocks in the first column represent processes that execute on the host 122. Blocks in the second column represent processes that execute on the switch 102. The block in the third column represents the RADIUS server 135 that executes on the RADIUS server host 132. The block in the fourth column represents the DHCP server 113 that executes on the DHCP server host 112. Arrows indicate messages that are sent at a relative time given by the point of the arrow.

At time t1, supplicant 125 sends a request 222 for access at a physical port, e.g., at port 104b. The request is sent whenever the host is powered up or otherwise reconnected to the switch. The request includes information from a user of the host, such as user identification and a password, according to IEEE 802.1x. Different persons might use a single host at different times. The user at the time the host becomes connected is typically responsible for disconnecting before a second user employs the same host. The authenticator 105 receives the request.

At time t2, after t1, the authenticator 105 sends a request 224 to the RADIUS server 135 according to IEEE 802.1x. The request 224 includes at least some of the information about the host and user received in the request 222. The RADIUS server then determines whether the user is authentic based on the user information and, if so, whether the authentic user is authorized to connect to the local network. If the user is not authentic or not authorized to connect, a response is sent indicating that authentication fails, according to IEEE 802.1x. In response to a failed authentication, the authenticator causes the switch to block network traffic with the host through the physical port 104b.

If the user is authentic, and the authentic user is authorized to connect to the local network, then a response 232 is prepared that includes authentication data indicating that authentication succeeds and authorization data indicating any services the user is privileged to request. According to some embodiments, the authentication data includes credentials that identify the user, such as with a user identification ("user ID"), and that assure a trusted RADIUS server is the source of the authentication and authorization. In the illustrated embodiment, the authorization data also indicates the user class associated in the user profile data 136 with an authentic user.

At time t3 after t2, the response 232, including the authentication and authorization data, is sent to the authenticator 105 on switch 102.

In a first set of embodiments, a message 230 is sent to the DHCP server with at least some of the authentication and authorization data, as described below with respect to FIG. 5A. For example, a message 230 is sent with the user class and a media access control (MAC) identification number that uniquely identifies the host that is being operated by the user. The DHCP server is modified to accept message 230. For example, in one embodiment the message is a DHCP message, such as a DHCPREQUEST message or a DHCPINFORM message, with options defined that indicate the message contains authentication and authorization information. In another embodiment, the message is not a DHCP message but is simply a data packet having a destination IP address of the DHCP server and a destination logical port of well-known port 67. In a second set of embodiments, the message 230 is not generated or sent by the RADIUS server.

When the response 232 is received at time t3 by the authenticator 105 on switch 102, the authenticator enables the physical port on which the request 222 was received at time t1. For example, the authenticator 105 enables physical port 104b to exchange data packets with the host 122. The authenticator generates an acknowledgment message 238, according to IEEE 802.1x, and sends the message 238 at time t4 after time t3.

According to the second set of embodiments, message 230 is not generated or sent by the RADIUS server; but, instead, at least some authentication and authorization data 236 are passed to the DHCP relay agent 103 from the authenticator 105. In an illustrated embodiment, the passed authentication and authorization data 236 are stored in a persistent store 108 on the switch 102. The DHCP relay agent 103, which also executes on the switch 102, also has access to the persistent store 108. In other embodiments, other means are used to pass authentication and authorization data 236 to the DHCP relay agent. For example a message containing authentication and authorization data 236 is sent from the authenticator 105 to the DHCP relay agent 103. In some embodiments, the functions of the authenticator and the DHCP relay agent are performed by the same process; the authentication and authorization information is passed to the relay agent through the memory location of the authentication and authorization information.

At time t5 after time t4, the IPv6 process 107 on the switch advertises the subnet of IPv6 addresses for the switch 102 and instructs the hosts connected to the switch 102 to obtain configuration information using DHCP. At time t6 after time t5, the IPv6 process 127 on the host 122 determines an IPv6 address for the host 122 based on the subnet advertised by the IPv6 process 107 on switch 102. In some embodiments, IPv6 process 107 for the switch 102 does not instruct the hosts connected to the switch 102 to obtain configuration information using DHCP. It is likely to be practical for such hosts to obtain configuration information from a configuration server, like the DHCv6 server 113, in any case. For example, the clients on host 122 may be unable to determine a DNS address without help from the configuration server. According to IPv6, other servers on the network, like the DNS, can determine their own addresses, so those addresses might not be the same as any addresses stored with client process on host 122. Thus the client processes on host 122 depend on a configuration server to know the current address of such servers.

At time t7 after t6, the DHCP client 123 on the host 122 sends a DHCP INFORM message 242 to request configuration information. A conventional switch without a DHCP relay agent would receive and then also transmit the same DHCP INFORM message. In addition, the first set of embodiments do not require a DHCP relay agent 103 be included on the switch 102. However, according to the second set of embodiments, the switch includes the DHCP relay agent 103.

The DHCP relay agent directs the IP data packet containing the DHCP INFORM message 252 to a DHCP server using the IP address of the DHCP server host 112 for which the relay agent 103 is configured. DHCP messages are included in UDP/IP data packets, which include a destination field and a source field. The relay agent 103 places the IP address of the DHCP server host 112 in the destination address of the data packet, and places the well-known port, 67, in the destination logical port field of the data packet.

Figure 3:
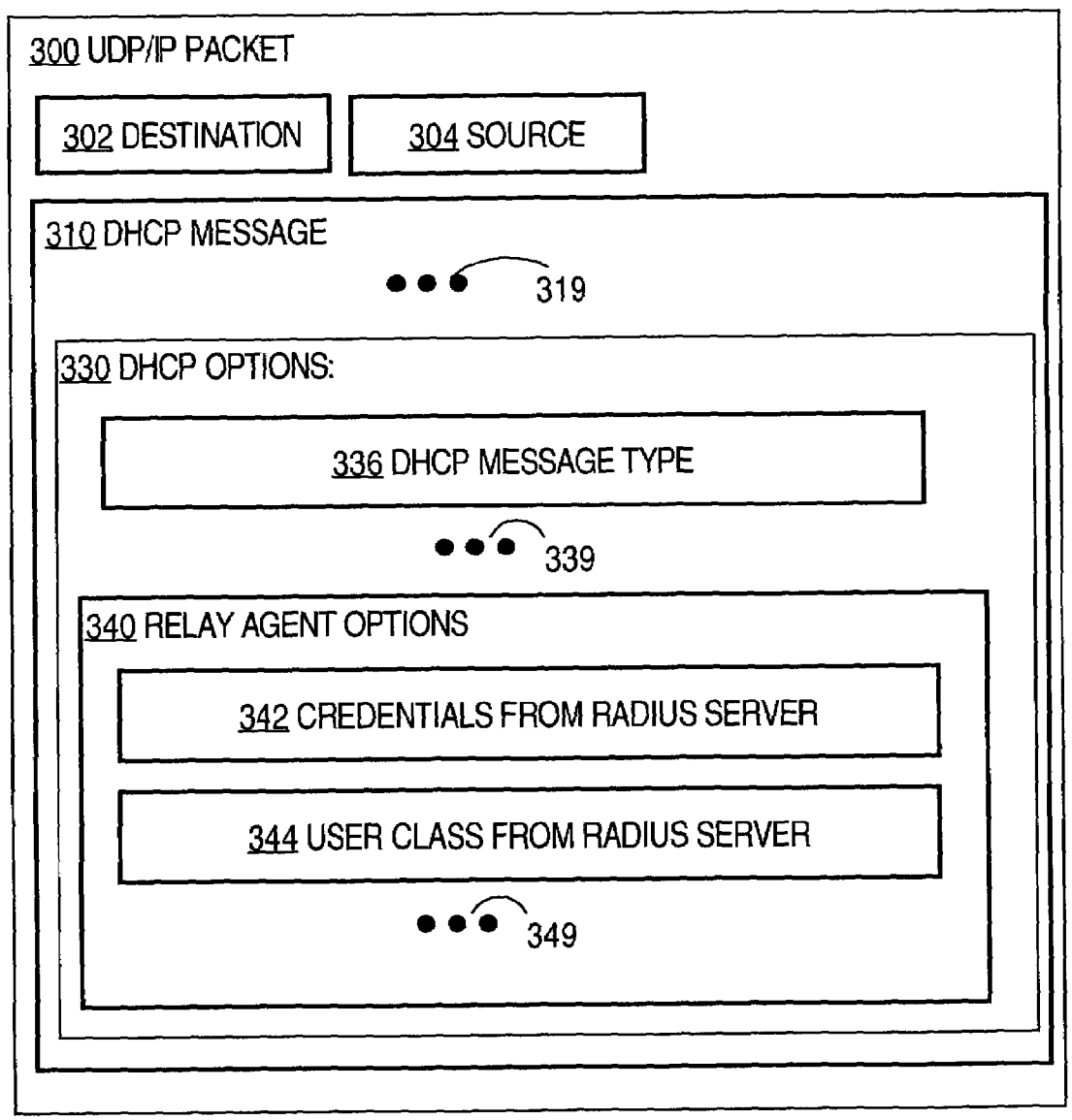
FIG. 3 is a block diagram that illustrates an DHCP information request message.

Further, before sending the data packet containing the DHCP INFORM message 252 to the DHCP server 113, the DHCP relay agent 103 includes authentication and authorization information in the DHCP INFORM message. To illustrate one way in which this is accomplished, consider FIG. 3. FIG. 3 is a block diagram that illustrates a DHCP INFORM message 330 in a UDP/IP data packet 300 according to an embodiment.

UDP/IP packets include a destination field 302 and a source field 304. The destination field holds data indicating the IP address of the intermediate device or host that is to receive the UDP/IP packet. Routers efficiently transmit UDP/IP packets using hardware configured to interpret the destination address in destination field 302. The source field holds data indicating the IP address of the intermediate device or host that sent the UDP/IP packet. In the illustrated embodiment, the source field contains the auto-configured IPv6 address determined by the host 122 for itself.

The UDP/IP packet includes payload data that is not used by UDP/IP to transfer packets. The illustrated embodiment includes a DHCP message 310 in the data payload. A DHCP message 310 includes a set of fields used in an earlier protocol for passing IP addresses, and a set of fields in a DHCP options portion 330 of the DHCP message. The fields of the earlier protocol are indicated by the ellipsis 319.

The fields in the DHCP options portion include the DHCP message-type field 336, among others. The DHCP message-type field 336 holds data that indicates the type of message. In the illustrated embodiment, the DHCP message type field holds data indicating an information request (an "INFORM" message type). Other fields of the DHCP options portion are indicated by the ellipsis 339.

The DHCP options portion includes a DHCP relay agent options portion 340. According to the second set of embodiments, DHCP relay agent options are added to carry authentication and authorization data. The options are specified according to the DHCP for specifying options in a DHCP message. In one embodiment, the DHCP relay agent option includes a credentials field 342 and a user class field 344.

The credentials field 342 includes data that indicates the actual user, such as a user identification ("user ID"), and that indicates that the trusted RADIUS server is the source of the authentication and authorization data. The user class field 344 includes data indicating the user class for the user of the host 122, as determined by the RADIUS server 135. Other fields of the relay agent options portion are indicated by the ellipsis 349.

At time t8 after t7, the DHCP relay agent 103 sends a DHCP INFORM message 252 in a UDP/IP data packet directed to the DHCP server 113. The DHCP INFORM message 252 includes authentication and authorization data 236. For example, the DHCP INFORM message includes data in the credentials field 342 and in the user class field 344.

According to the illustrated embodiment, the DHCPv6 server 113 stores a map 114 that associates the auto-configured IPv6 address with data in the credentials field 342 and the user class field 344. The auto-configured IPv6 address is thus registered with the network.

In addition, the DHCPv6 server 113 selects configuration information based on the authentication and authorization data 236 in the DHCP discovery message 252. For example, the DHCP server 113 determines a particular user class from the data in the user class field 344. The DHCP server 113 finds the particular user class in the map 118 associating user classes with corresponding DNSs, and determines the corresponding DNS for the user class. For purposes of illustration, it is assumed that the corresponding DNS has an IP address represented by the symbol "IPdnslocal," which resolves only domain names on the local network 106 and returns an error for domain names outside the local network 106.

If the message 230 is sent from the RADIUS server 135 to the DHCP server 113 instead of sending the data 236 from the authenticator 105 to the DHCP relay agent 103, then the configuration information is selected based on the data in message 230 and the MAC address.

The DHCP server 113 then performs other configuration information generation according to conventional methods or methods known in the art at the time the system is implemented, and generates a DHCP information response ("INFORM RESPONSE") message 262.

At time t9 after t8, the DHCP INFORM RESPONSE message 262 is sent from the DHCP server 113 back through the relay agent, which strips off the relay-agent information option, and directs the message to the DHCP client 123. The DHCP client uses the information in the DHCP INFORM RESPONSE message 262 to configure the host 122.

After the host 122 is configured, a client on the host may attempt to access resources on the Internet. For example, a browser on the host 122 may request a Web page from a Web site on the Internet. The Web page is usually indicated by a universal resource locator (URL) that includes a domain name. The browser sends the domain name to the domain name server for the host 122 as determined by the configuration information sent in the INFORM RESPONSE message 262. The domain name server finds an IP address that is associated with the name, if any. If no address is associated with the name, the domain name server returns an error message. In the illustrated embodiment, the DNS for host 122 is at address IPdnslocal, which does not resolve the domain name of the Web page requested by the browser. The user is informed, through the browser on host 122, that the web site is not available or could not be found.

If the user attempts to reach a Web site by its IP address instead of its URL, which is unusual, then the DNS will be bypassed. The request for the Web page is a data packet that includes the IP address of the host 122 in the source field 304. Routers on the local network 106 direct the data packet to the gateway 145. The gateway checks the IP address in the source field 304 against the list of IP addresses in the access control list 146. If the IP address is listed in the access control list, the data packet is forwarded to the Internet 150. For the illustrated example, the IP address of host 122 is not listed in the access control list 146 on gateway host 142. The gateway 145 requests from DHCP server host 112 data from the map 114 that identifies the user and user group associated with the IP address, and based on that information determines to add the IP address of host 122 to a list of those source addresses denied access to the Internet 150; the gateway may request authorization for the identified user from the AAA server 132. The gateway then denies access to the Internet 150 for all messages having a source IP address of host 122.

It is noted that denying a client access to the Internet using this latter embodiment involves many more steps and consumes more resources on the local network and its server than does denying the client access based on a response from the DNS server at IPdnslocal.

3.0 Method of Registering Auto-Configured Addresses

Figure 4:
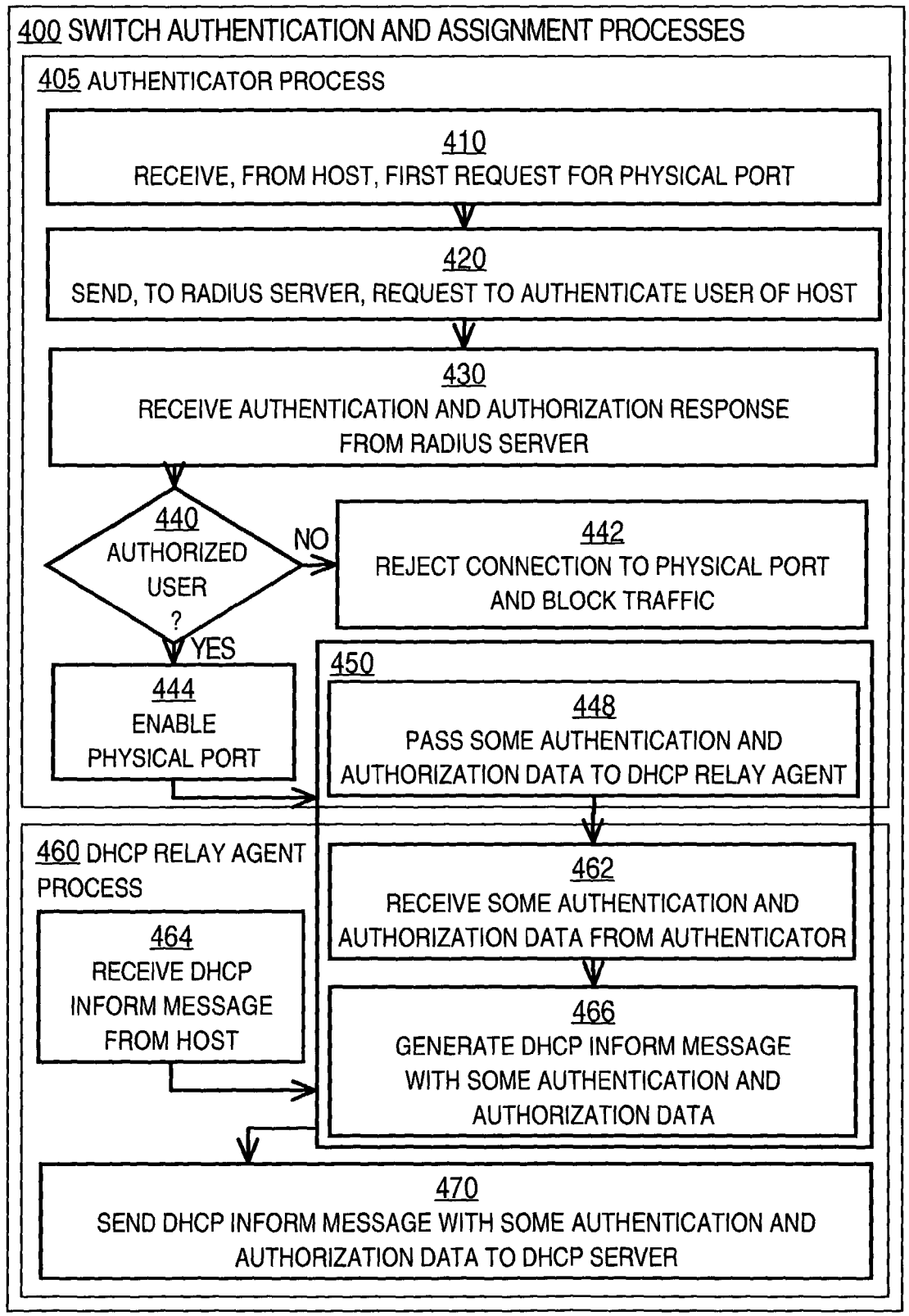
FIG. 4 is a flow diagram that illustrates one embodiment of a method performed at a switch for registering an auto-configured IP address based on connection authentication.

FIG. 4 is a flow diagram that illustrates an embodiment performed at switch 102 of a method for registering an auto-configured IP address based on connection authentication. Steps in method 400 are divided between an authenticator process 405 and a DHCP relay agent process 460. The authenticator process is described below in section 3.1; the DHCP relay agent process is described below in section 3.2. In other embodiments, the steps of method 400 are performed by a single process or by more than two different processes.

Figure 5A:
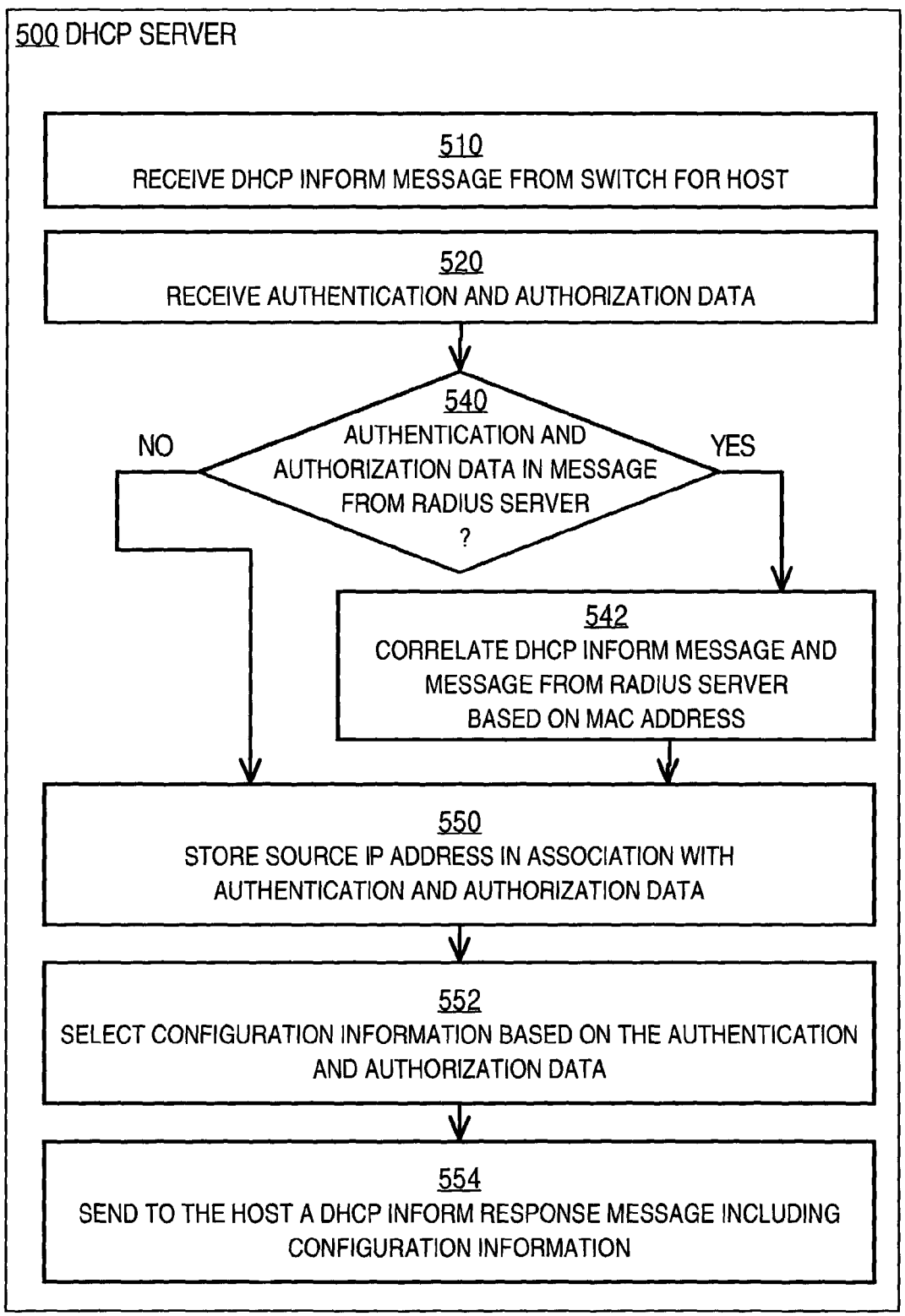
FIG. 5A is a flow diagram that illustrates one embodiment of a method performed at a configuration server for registering an auto-configured IP address based on connection authentication.
Figure 5B:
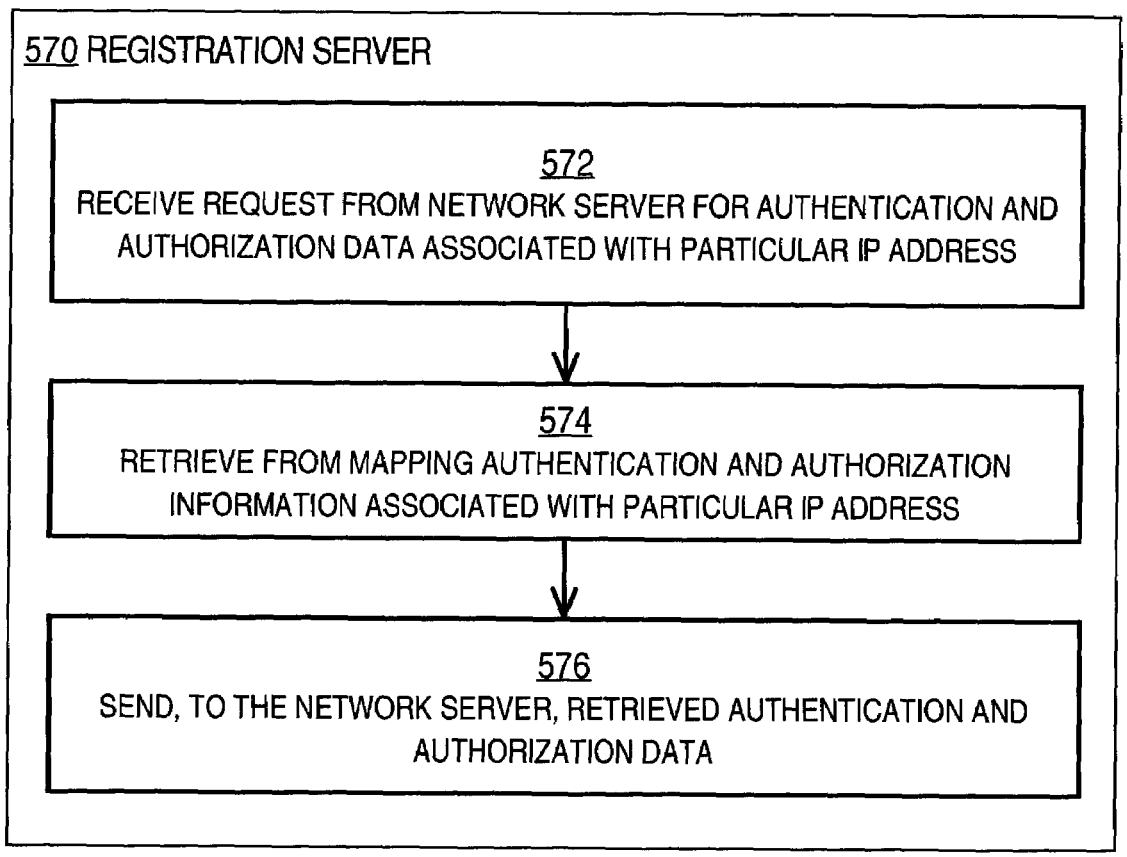
FIG. 5B is a flow diagram that illustrates an embodiment of a method performed at a host that registers an IP address based on connection authentication.

FIG. 5A and FIG. 5B are flow diagrams that illustrate embodiments performed at DHCP server host 112 of a method for registering an auto-configured IP address based on connection authentication. The methods of FIG. 5A and FIG. 5B are described below in section 3.3. In other embodiments, the steps of FIG. 5A and FIG. 5B are performed by a single DHCP server or by multiple different processes.

Although the steps are illustrated in these flow diagrams in a particular order, in other embodiments some steps may be reordered or overlap in time.

3.1 Authenticator

Referring to FIG. 4, the authenticator process 405 is performed as described in Schnizlein et al. In step 410, a request for use of a physical port is received from a newly connected host. For example, request 222 using IEEE 802.1x is received from supplicant 125 on host 122 at authenticator 105 on switch 102. An example request 222 includes a user identification string and a password supplied by a user of the host 122.

In step 420, a request to authenticate a user of the host is sent to an authentication and authorization server, such as the RADIUS server. For example, request 224 is sent from the authenticator 105 on switch 102 to the RADIUS server 135 on host 132. The request includes information received from the newly connected host. The request 224 may include the user identification string and the password.

In step 430, a response is received from the authentication and authorization server that indicates whether the user is authentic and is authorized to connect to the network. For example, response 232 is received at the authenticator 105 on switch 102 from authentication and authorization server 135 on host 132. The response also includes information about the user and the authentication and authorization server, at least if the user is authentic and authorized to connect. For example, the response includes a user class if the user is authorized to connect. The user class indicates which operations on the local network involve the user. For example, a particular user class for the user of host 122, included in the response received from the RADIUS server, indicates that the user may not access the Internet.

In step 440, a test is performed to determine whether the user is authorized to connect to the network. For example, it is determined whether the response from the authentication and authorization server indicates that the user is both authentic and authorized to connect to the local network. If not, control passes to step 442 to block network traffic through that port and to send a message to the host that network access is rejected. For example, the port is not enabled, and an IEEE 802.1x message that negates acknowledgement (an IEEE 802.1x "NAK" message) is sent to the newly connected host 122.

If the test of step 440 determines that the user is authorized to connect to the network, control passes to step 444. In step 444, the physical port is enabled so that network traffic is passed. According to the IEEE 802.1x standard, an acknowledgement message is sent to the newly connected host 122.

Control then passes to step 450 to generate a configuration request message based on the authentication and authorization information received from the authentication and authorization server in step 430 and on a request from the newly connected host for configuration information.

In embodiments in which the method 400 is divided between an authenticator process 405 and a DHCP relay agent process 460, step 450 includes step 448 performed by the authenticator 105, and steps 462 and 466 performed by the DHCP relay agent 103.

In step 448, at least some authentication and authorization data is passed to the DHCP relay agent. This is performed in any manner known in the art at the time the method 400 is implemented. For example, a message directed to the DHCP relay agent can be generated and sent. In the illustrated embodiment, the authentication and authorization data to be passed, including the user class, is stored in persistent store 108 on the switch 102. In either case the DHCP relay agent is also configured to receive the passed information.

3.2 Relay Agent

In step 464, a message is received from the newly connected host for configuration information. The message already includes an auto-configured logical address for the host as determined, at least in part, by the host. For example, the message includes in the source field 304 an IPv6 address determined by the host. In the illustrated embodiment, a DHCP INFORM message is received, from DHCP client 123 on host 122, at the switch 102 through the port 104*b*. In embodiments in which the method 400 is divided between an authenticator process 405 and a DHCP relay agent process 460, the DHCP INFORM message received from DHCP client 123 on host 122 in step 464 is received by the DHCP relay agent 103.

In step 462, the DHCP relay agent 103 receives the authentication and authorization information passed by the authenticator 105. For example, the DHCP relay agent 103 retrieves the authentication and authorization data from the persistent store 108. In the illustrated embodiment, the data retrieved from persistent store 108 includes the particular user class of the user of host 122. In some embodiments, the data is retrieved from the persistent store in response to receiving the DHCP request message from the host in step 464.

In step 466 the DHCP relay agent 103 generates a revised DHCP INFORM message that includes at least some of the authentication and authorization information. For example, the DHCP relay agent 103 generates INFORM message 252 with data indicating the particular user class placed into the user class field 344. In some embodiments, other authentication and authorization information is placed into the credentials field 342. In step 470, the revised INFORM message is sent to the DHCP server 113 on host 112 to register the IP address by storing the auto-configured IP address in association with at least some of the authentication and authorization information.

In subsequent steps, not shown, the DHCP relay agent 103 forwards other DHCP messages between DHCP client 123 and DHCP server 113 according to any method known in the art at the time the method 400 is implemented. After the auto-configured IP address is registered with the DHCP server, the data in the persistent store may be overwritten, such as when the host reconnects with physical port 104*b*.

3.3 DHCP Server

FIG. 5A is a flow diagram that illustrates an embodiment 500 of a method performed at a configuration server for registering an IP address based on connection authentication. For example, DHCP server 113 performs method 500.

Method 500 applies in the two sets of embodiments. In the first set of embodiments, the DHCP INFORM message is relayed from the switch, and AAA data is sent to the configuration server directly from the AAA server. Conventional authenticators and DHCP servers may be used on switch 102 in the first set of embodiments. That is, method 400 illustrated in FIG. 4, is optional in the first set of embodiments. In the second set of embodiments, the DHCP INFORM message includes AAA data as a result of the steps taken in embodiment 400.

In step 510, a DHCP INFORM message for obtaining configuration information for a host is received from the switch. For example, the DHCP INFORM message 252 is received from the DHCP relay agent 103 on the switch 102.

In step 520, AAA data is received. In the first set of embodiments, the AAA data is received in a separate message from the AAA server. In the second set of embodiments, the AAA data is received in the DHCP INFORM message. For example, the DHCP INFORM message includes data indicating the particular user class of the user of host 122.

Step 540 represents a test that determines whether the AAA data came directly from the AAA server, as in the first set of embodiments. For example, step 540 determines whether the AAA data were not received in the DHCP INFORM message but instead were received in message 230 from the RADIUS server. The test of step 540 may be implemented in any manner known in the art. For example, step 540 may be implemented as a branch point in a program. In addition, the test may be made as a design choice to employ only the first set of embodiments, or only the second set of embodiments. In the second set of embodiments, control passes to step 550, described below.

In the first set of embodiments, in which the AAA data is received in a message from the AAA server, such as in message 230 from the RADIUS server, control passes to step 542 to correlate the message from the AAA server with the configuration message from the switch 102. For example, a media access control (MAC) address installed on each host by a manufacturer is included in each message 230 and each DHCP INFORM message. A message 230 from the RADIUS server 135 is considered correlated with a DHCP message from switch 102, if both have the same MAC address and the DHCP message is received within a certain limited time of sending the message 230. The limited time makes likely that the user of the host has not changed since the user information was provided to the RADIUS server. In other embodiments, other methods known in the art at the time the method is implemented to correlate two messages are employed. The data packet with the DHCP message includes the auto-configured IP address in the source field 304.

Control then passes to step 550 to register the auto-configured IP address by storing the address in a map in association with the authentication and authorization information from the message. For example, DHCP server 113 stores the auto-configured IPv6 address in map 114 with the credentials data and the user group.

In step 552, the DHCP server selects configuration information based on at least some of the authentication and authorization information associated with the auto-configured IP address. In some embodiments, step 552 may be omitted. For example, DHCP server 113 selects a DNS based on the particular user class of the user of host 122 included in the authorization data.

In step 554, configuration information, such as an IP address of the DNS, is sent to the host. For example, a DHCP INFORM response message 262 is sent to the host 122 with an IP address of "Ipdnslocal" for the DNS. In subsequent steps, not shown, clients on host 122 attempt to resolve URL domains using the DNS server at IPdnslocal, which returns an error if the URL does not refer to a host on the local network 106.

FIG. 5B is a flow diagram that illustrates an embodiment 570 of a method performed at a host that can access IP address registration information based on connection authentication, such as map 114. For example, a process on host 122, such as DHCP server 113, performs method 570. In other embodiments, the process executes in a different host on the network In step 572, a request is received from a server on the local network, such as local network 106. The request includes a particular auto-configured IP address of a host requesting a service from the server. The request is for at least some of the authentication and authorization information associated with IP addresses in the register's mapping, such as map 114. For example, a request is received from gateway 145 for a user group associated with the auto-configured IP address of host 122. In the illustrated embodiment, the DHCP server 113 is modified to accept the request. For example, in one embodiment the request is a DHCP message, such as a DHCP REQUEST message or a DHCP INFORM message, with options defined that indicate the message contains a request for authentication or authorization information associated with a registered logical address.

In step 574, authentication and authorization information associated with the particular auto-configured IP address is retrieved from the register's mapping. For example, the identity and user group associated with the user of host 122 is retrieved from the map 114.

In step 576, at least some of the authentication and authorization information associated with the particular auto-configured IP address is sent to the network server. For example, the user group associated with the user of host 122 is sent to gateway 145. This information is used by the network server to provide or deny its service to the client.

For example, the gateway 145 denies clients on host 122 from access to the Internet 150 based on the user group of the user of host 122.

4.0 Implementation Mechanisms—Hardware Overview

Figure 6:
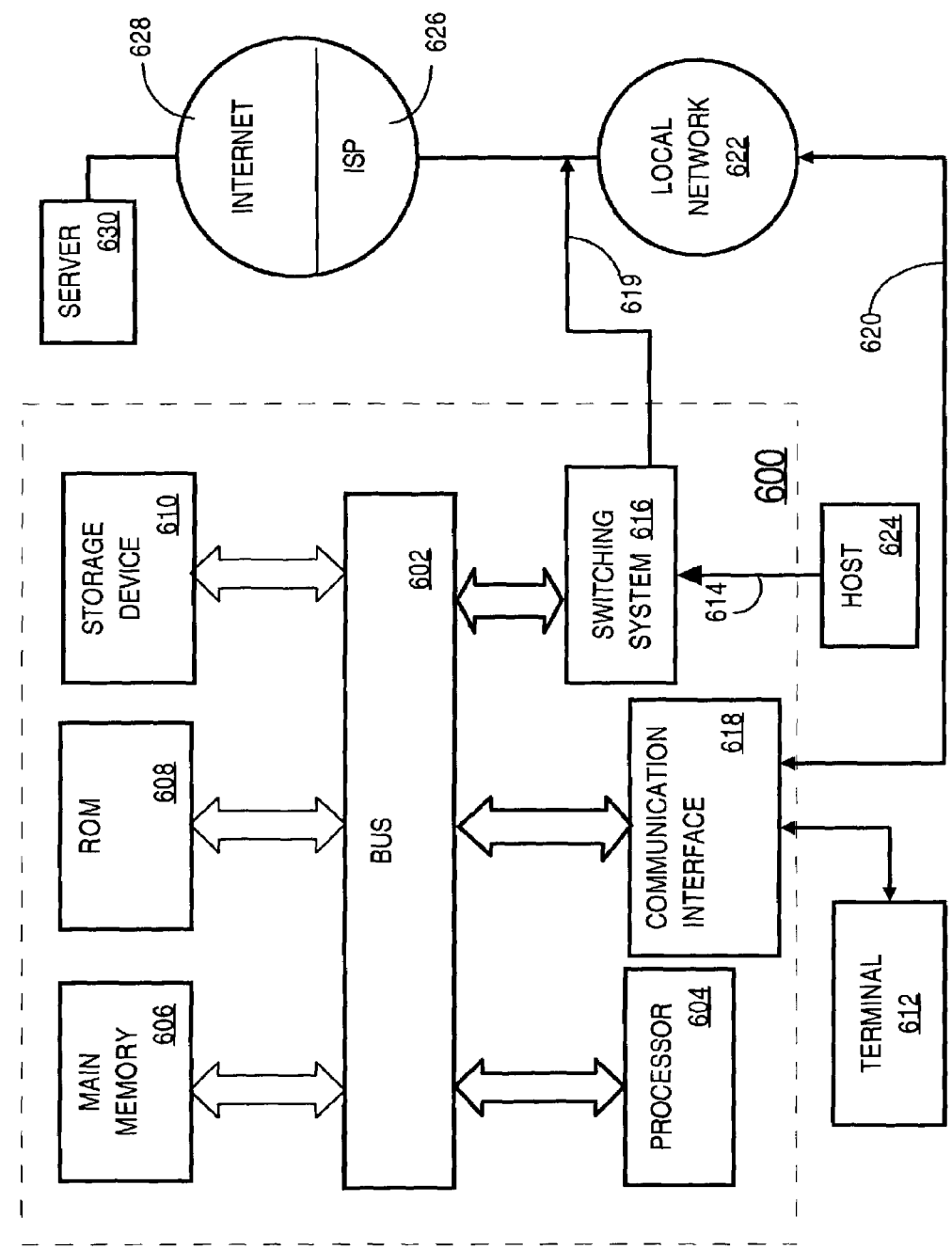
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for registering auto-configured network addresses based on connection authentication. According to one embodiment of the invention, registering auto-configured network addresses based on connection authentication is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM (programmable read-only memory), and EPROM (erasable programmable read-only memory), a FLASH-EPROM (a rapidly electrically erasable and writable erasable programmable read-only memory), any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams.

The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for registering auto-configured network addresses based on connection authentication as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of registering auto-configured network addresses, the method comprising:
   receiving, at a networking device connected to a host at a physical connection, from a first server, first data indicating at least some authentication information associated with the host;
   receiving at the networking device from the host, a first message requesting configuration information, the first message including a logical network address for the host determined at least in part by the host;
   generating a second message based on the first message and the first data; and
   sending the second message to a second, dynamic host control protocol (DHCP) server that registers the host by associating the logical network address with the first data;
   wherein the first server provides authentication and authorization in response to a request for authentication for the physical connection; an authenticator process sends the request for authentication and performs receiving the first data; a DHCP relay agent process for the second server performs receiving the first message and sending the second message; and generating the second message further comprises sending a third message from the authenticator process to the relay agent process based on the first data.

2. A method as recited in claim 1, wherein the step of generating the second message further comprises the steps of:
   storing second data based on the first data by the authenticator process; and
   retrieving the second data by the relay agent process in response to the step of receiving the first message.

3. A method as recited in claim 1, wherein the first server is an authentication, authorization and accounting server.

4. A method as recited in claim 3, wherein the first server is a RADIUS (Remote Access Dial-In User Service) protocol server.

5. A method as recited in claim 1, wherein the physical connection comprises an Ethernet interface card on the networking device.

6. A method as recited in claim 1, wherein the physical connection comprises a wireless Ethernet encryption key and time slot.

7. A method as recited in claim 1, wherein receiving the first data is performed according to an Institute of Electrical and Electronics Engineers (IEEE) 802.1x standard.

8. A method as recited in claim 1, wherein generating the second message is performed according to dynamic host configuration protocol (DHCP).

9. A method as recited in claim 1, wherein:
   the first data includes user class data indicating a particular group of one or more authorized users of the host; and
   the step of generating the second message is further based on the user class data.

10. A method as recited in claim 1, wherein:
    the first data includes credential data indicating authentication is performed by the first server; and
    the step of generating the second message is further based on the credential data.

11. A method as recited in claim 1, wherein:
    the first data includes a user identification that indicates a particular user; and
    the step of generating the second message is further based on the user identification.

12. A method as recited in claim 1, further comprising:
    based on the first data, enabling the physical connection to forward subsequent messages between the host and a network connected to the networking device; and
    storing the first data at least until a third request is received from the host for configuration information for the host, the third request including a logical network address for the host determined at least in part by the host, for associating the first data with the logical network address.

13. A computer-readable tangible storage medium carrying one or more sequences of instructions for registering auto-configured network addresses, which instructions, when executed by one or more processors, cause the one or more processors to carry out the steps of:
    receiving, at a networking device connected to a host at a physical connection, from a first server, first data indicating at least some authentication information associated with the host;
    receiving at the networking device from the host, a first message requesting configuration information, the first message including a logical network address for the host determined at least in part by the host;
    generating a second message based on the first message and the first data; and
    sending the second message to a second, dynamic host control protocol (DHCP) server that registers the host by associating the logical network address with the first data;
    wherein the first server provides authentication and authorization in response to a request for authentication for the physical connection; an authenticator process sends the request for authentication and performs receiving the first data; a DHCP relay agent process for the second server performs receiving the first message and sending the second message; and generating the second message further comprises sending a third message from the authenticator process to the relay agent process based on the first data.

14. A computer-readable tangible storage medium as recited in claim 13 carrying one or more further sequences of instructions, which instructions, when executed by one or more processors, cause the one or more processors to carry out:
based on the first data, enabling the physical connection to forward subsequent messages between the host and a network connected to the networking device; and
storing the first data at least until a third request is received from the host for configuration information for the host, the third request including a logical network address for the host determined at least in part by the host, for associating the first data with the logical network address.

15. An apparatus for registering auto-configured network addresses, comprising a networking device connected to a host at a physical connection, further comprising:
means for receiving, from a first server, first data indicating at least some authentication information associated with the host;
means for receiving, from the host, a first message requesting configuration information, the first message including a logical network address for the host determined at least in part by the host;
means for generating a second message based on the first message and the first data; and
means for sending the second message to a second, dynamic host control server that registers the host by associating the logical network address with the first data;
wherein the first server provides authentication and authorization in response to a request for authentication for the physical connection; an authenticator process sends the request for authentication and performs receiving the first data; a DHCP relay agent process for the second server performs receiving the first message and sending the second message; and generating the second message further comprises sending a third message from the authenticator process to the relay agent process based on the first data.

16. An apparatus for registering auto-configured network addresses, comprising:
a network interface that is coupled to a data network for receiving therefrom, and sending thereto, one or more packet flows;
a physical connection that is coupled to a host;
a processor;
one or more stored sequences of instructions which, when executed by the processor, cause the processor to carry out the steps of:
receiving, from a first server, first data indicating at least some authentication information associated with the host;
receiving, from the host, a first message requesting configuration information, the first message including a logical network address for the host determined at least in part by the host;
generating a second message based on the first message and the first data; and
sending the second message to a second, dynamic host control protocol (DHCP) server that registers the host by associating the logical network address with the first data;
wherein the first server provides authentication and authorization in response to a request for authentication for the physical connection; an authenticator process sends the request for authentication and performs receiving the first data; a DHCP relay agent process for the second server performs receiving the first message and sending the second message; and generating the second message further comprises sending a third message from the authenticator process to the relay agent process based on the first data.

17. The apparatus of claim 15, wherein the means for generating the second message further comprises means for storing second data based on the first data by the authenticator process; and means for retrieving the second data by the relay agent process in response to the step of receiving the first message.

18. The apparatus of claim 15, wherein the means for generating the second message operates according to dynamic host configuration protocol (DHCP).

19. The apparatus of claim 15, wherein the first data includes user class data indicating a particular group of one or more authorized users of the host; and the means for generating the second message performs generating the second message based on the user class data.

20. The apparatus of claim 15, wherein the first data includes credential data indicating authentication is performed by the first server; and the means for generating the second message performs generating the second message based on the credential data.

21. The apparatus of claim 15, wherein the first data includes a user identification that indicates a particular user; and the means for generating the second message performs generating the second message based on the user identification.

22. The apparatus of claim 15, further comprising:
means for enabling the physical connection to forward subsequent messages between the host and a network connected to the intermediate device based on the first data;
means for storing the first data at least until a third request is received from the host for configuration information for the host, the third request including a logical network address for the host determined at least in part by the host, for associating the first data with the logical network address.

23. The apparatus of claim 16, wherein the instructions for generating the second message further comprise instructions for storing second data based on the first data by the authenticator process and instructions for retrieving the second data by the relay agent process in response to the step of receiving the first message.

24. The apparatus of claim 16, wherein the instructions for generating the second message operate according to dynamic host configuration protocol (DHCP).

25. The apparatus of claim 16, wherein the first data includes user class data indicating a particular group of one or more authorized users of the host; and the instructions for generating the second message perform generating the second message based on the user class data.

26. The apparatus of claim 16, wherein the first data includes credential data indicating authentication is performed by the first server; and the instructions for generating the second message perform generating the second message based on the credential data.

27. The apparatus of claim 16, wherein the first data includes a user identification that indicates a particular user;

and the instructions for generating the second message perform generating the second message based on the user identification.

28. The apparatus of claim 16, further comprising instructions which, when executed by the one or more processors, cause the one or more processors to perform:
- enabling the physical connection to forward subsequent messages between the host and a network connected to the intermediate device based on the first data;
- storing the first data at least until a third request is received from the host for configuration information for the host, the third request including a logical network address for the host determined at least in part by the host, for associating the first data with the logical network address.

29. A computer system, comprising:
- an Ethernet switch coupled to a network and coupled to a user host computer, the switch comprising an authenticator process and a dynamic host control protocol (DHCP) relay agent process;
- an authentication, authorization and accounting (AAA) server that is coupled to the switch;
- a DHCP server that is coupled to the switch and the AAA server;
- one or more sequences of computer program instructions stored in the switch, which instructions, when executed by one or more processors in the switch, cause the one or more processors to perform:
  - sending, from the authenticator process of the switch to the AAA server, a request to authenticate the user host computer;
  - receiving from the AAA server in response to the request, authentication information associated with the user host computer;
  - sending the authentication information from the authenticator process to the DHCP relay agent process;
  - receiving at the DHCP relay agent process, from the host, a first message requesting host configuration information, the first message including a logical network address for the host determined at least in part by the host;
  - creating a second message that includes the logical network address for the host and the authentication information; and
  - sending the second message to the dynamic host control protocol (DHCP) server, which registers the host by storing the logical network address for the host in association with the authentication information.

* * * * *